T. P. BENTON.
Harvesters.
No. 158,825.
4 Sheets--Sheet 3.
Patented Jan. 19, 1875.
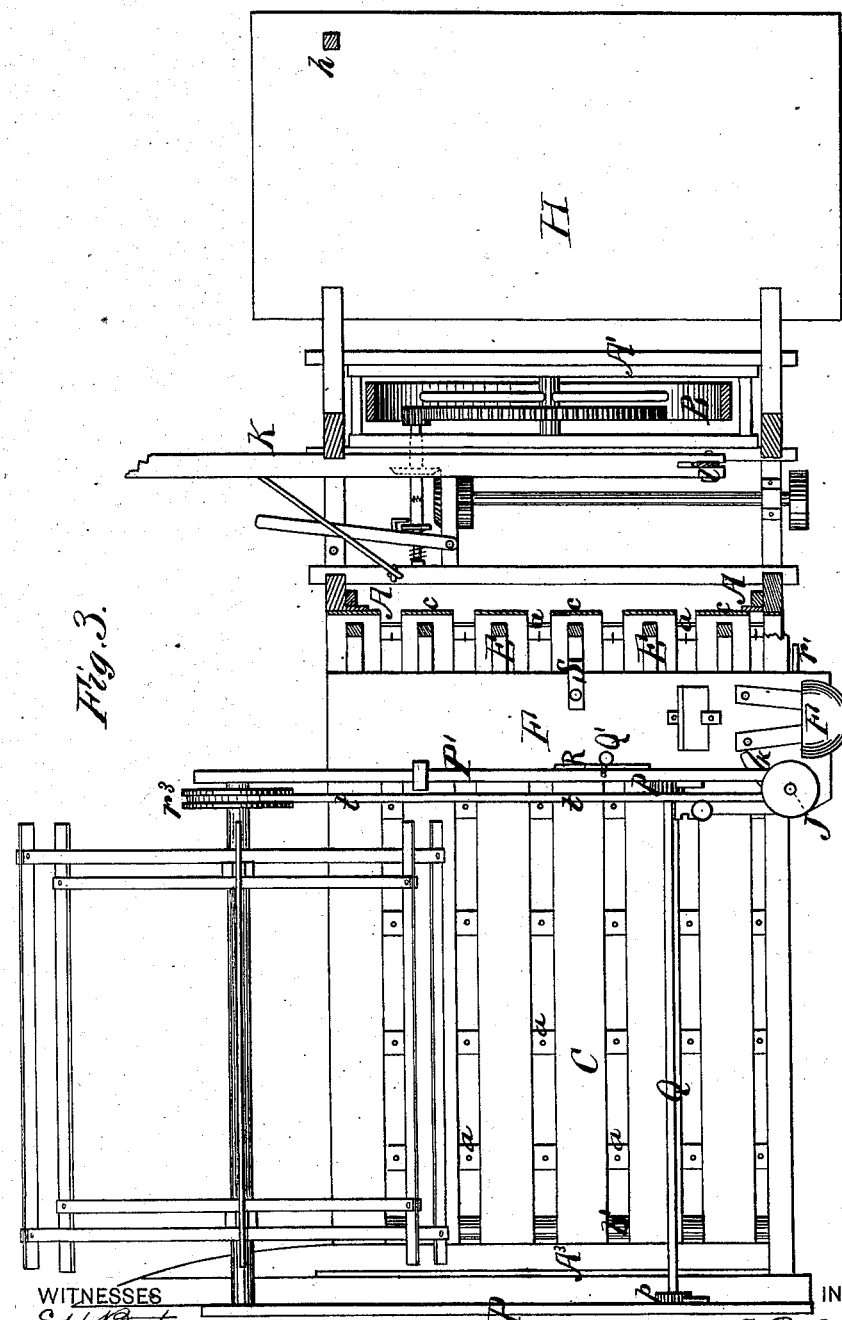
WITNESSES
INVENTOR T. P. BENTON.
Harvesters.
No. 158,825.
4 Sheets--Sheet 4.
Patented Jan. 19, 1875.
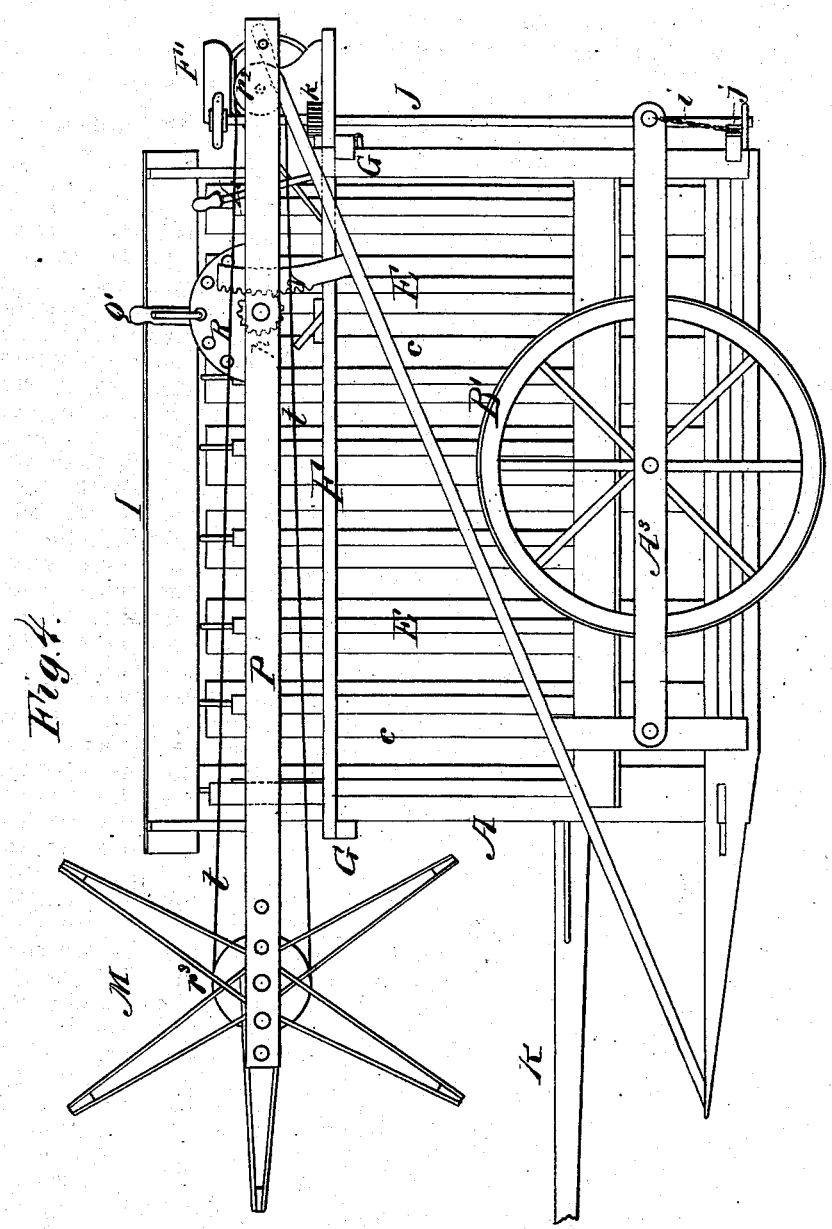
WITNESSES
E. H. Bates
George E. Upham
BY
INVENTOR
T. P. Benton
Chipman Hosmer & Co.
ATTORNEYS

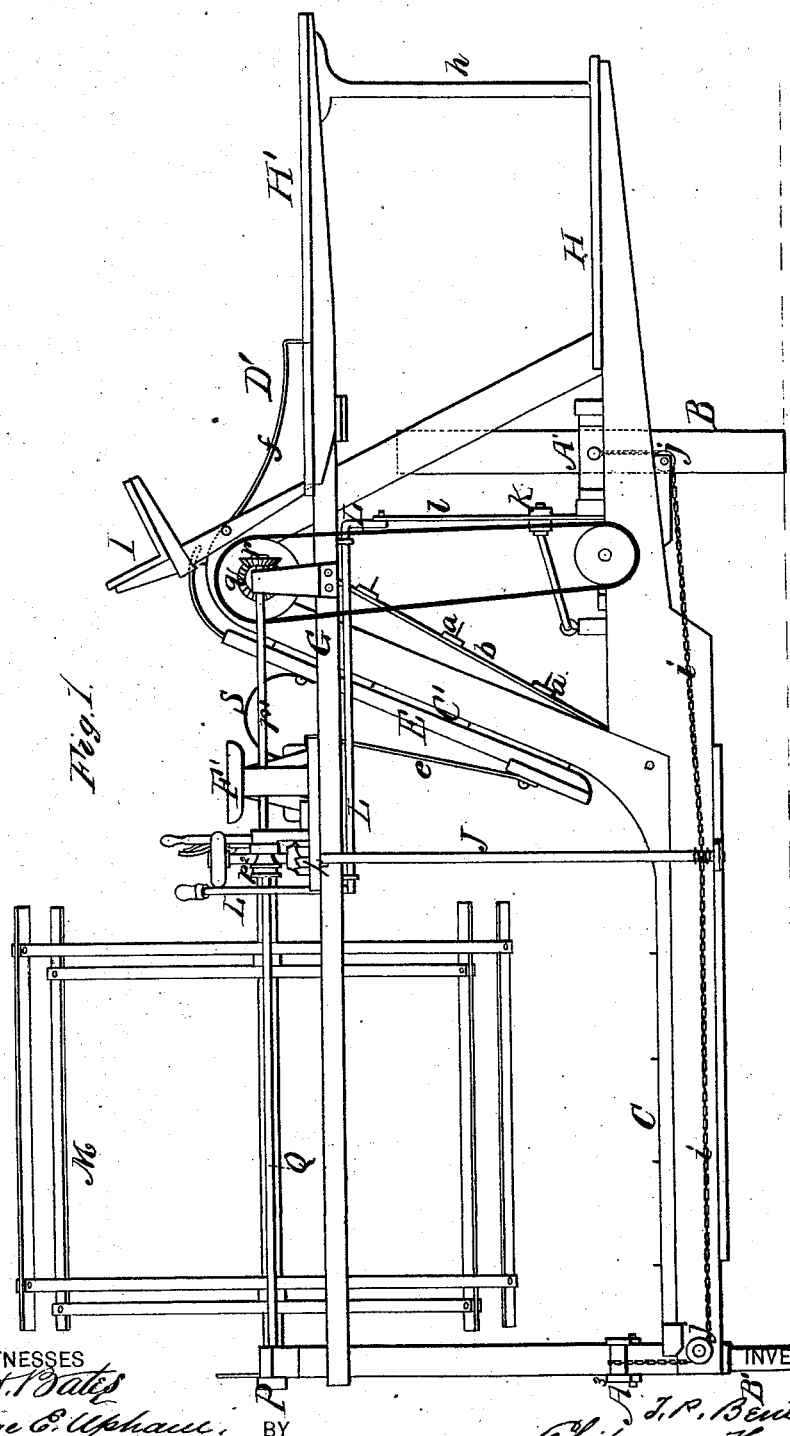

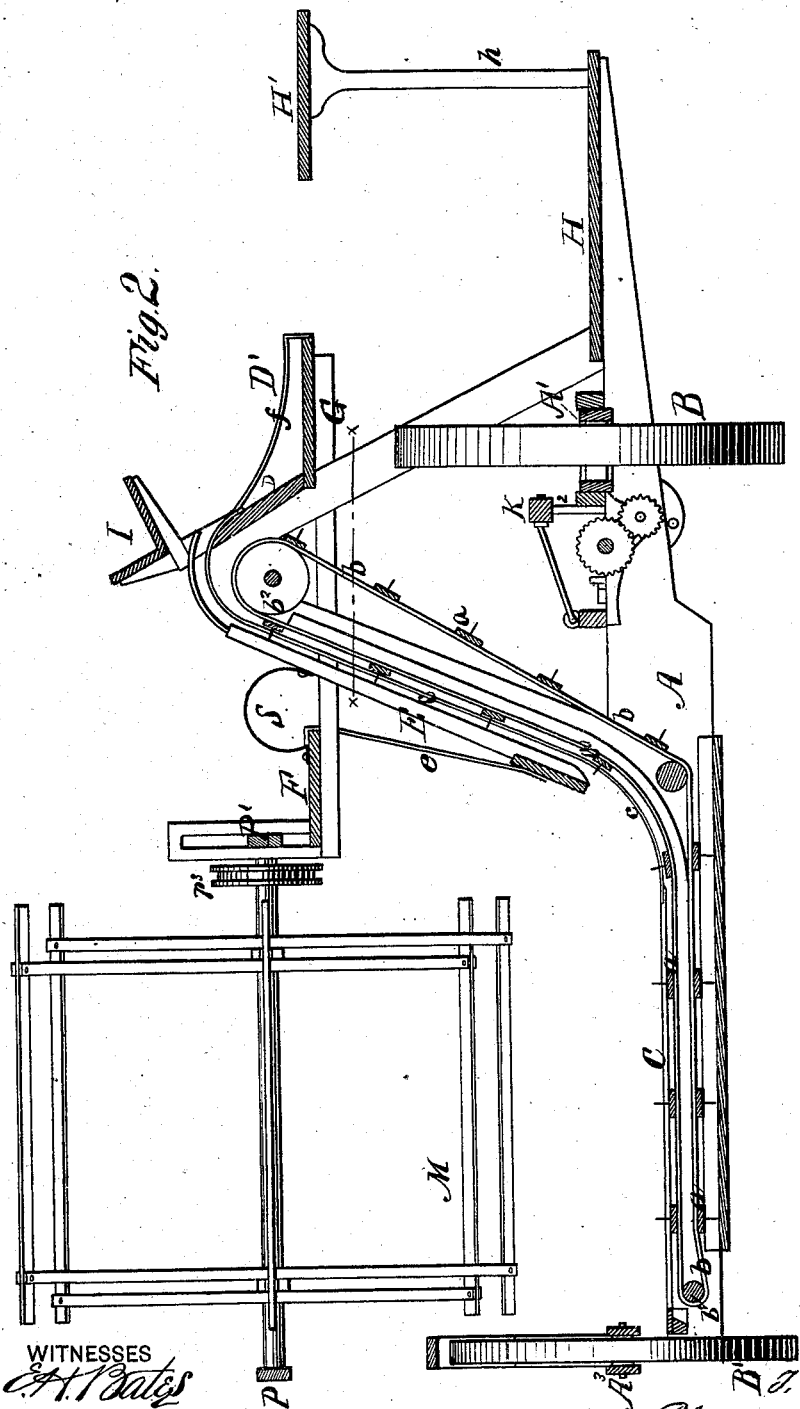

UNITED STATES PATENT OFFICE.

THOMAS P. BENTON, OF PRAIRIE DU SAC, WISCONSIN.

IMPROVEMENT IN HARVESTERS.

Specification forming part of Letters Patent No. 158,825, dated January 19, 1875; application filed May 16, 1874.

*To all whom it may concern:*

Be it known that I, THOMAS P. BENTON, of Prairie du Sac, in the county of Sauk and State of Wisconsin, have invented a new and valuable Improvement in Harvesters; and I do hereby declare that the following is a full, clear, and exact description of the construction and operation of the same, reference being had to the annexed drawings making a part of this specification, and to the letters and figures of reference marked thereon.

Figure 1 of the drawing is a representation of an end view of my harvester. Fig. 2 is a sectional view of the same. Fig. 3 is a plan view, and Fig. 4 is a side view.

This invention has relation to grain-harvesters, which are provided with means for allowing persons riding on the machines to conveniently bind the grain.

My improvements consist in a band-trough arranged above the delivery end of an elevator; also, in novel means for raising and lowering the reel, and also in a novel contrivance whereby the driver, sitting in his seat on the rear part of the machine, can raise or depress both ends thereof at the same time, as will be hereinafter explained.

In the annexed drawings, A designates the main draft-frame, which is mounted on two transporting-wheels, B B'. C designates the platform on which the grain falls as it is cut, which platform is composed of narrow boards or strips arranged so as to leave spaces between them for the passage of teeth, which are applied to bars $a$ secured to endless belts $b$. The belts $b$ are carried around a roller, $b^1$, near the grain end of the platform C and around pulleys $b^2$, near the highest point of the draft-frame $A^1$, shown in Fig. 2, and the ends of the toothed bars $a$ are guided in grooves made in the front and rear ends of the frame. The endless carrier thus constructed and arranged receives its movements from the wheel B, through the medium of spur-wheels, pulleys, and an endless belt. The platform-slats' are continuous, with metal strips $c$, which are of the same width as the slats, and which extend up and are secured by their curved ends to an inclined board, D, thereby constituting the inclined plane C', up which the grain is elevated by the teeth of the endless carrier, and deposited in a receiver, D', for the binders to take it. The strips $c$ are corrugated longitudinally for the purpose of giving stiffness to them, and at the same time diminishing frictional surface. The grain is held upon the inclined plane C' by means of a rack, E, (which is suspended by straps $e$ from a horizontal board, F,) and may be held down upon the grain by means of a spring, S. This rack accommodates itself to the varying bulk of the grain, and prevents the grain from flying or falling back upon the platform C. The receiver D', into which the grain is deposited, is a horizontal board, which is secured upon bars G, over which board concave supports $f$ may be applied, upon which the grain is deposited. As these strips $f$ are raised above the board, the binders can conveniently pass the bands around the gavels preparatory to securing them. Below the grain-receiver D is the binder's stand H, which is constructed upon the sill-extensions of the frame A, and beyond the said receiver is a rectangular binder's table, H', which is secured to the rear bar G at one end, and supported by a prop, $h$, at the other end, upon the binder's table. Above the highest point of the inclined plane C' is a trough, I, in which the long straw used by the binders to bind the gavels is kept. The axle of the transporting-wheel B is journaled in a frame, A', which is pivoted at or near its front end to the front part of frame A, so that its rear end will be allowed free vertical vibration. The grain-wheel B' has its bearings in a frame, $A^3$, which, like the frame $A^1$, is pivoted at its front end. The rear ends of the two frames $A^1$ $A^3$ have chains $i$ $i$ secured to them, which are carried around pulleys $j$ $j$ and attached to the lower end of a rod, J, on the upper end of which is a hand-wheel located near the driver's seat. By turning the rod J, and winding or unwinding the chains $i$ $i$, the inner and outer ends of the machine can be raised or depressed together, and by means of a ratchet and pawl, $k$, the machine can be secured at any desired height. K designates the draft-pole, which has its fulcrum on the draft-frame at $z$, and which is connected to the cranked end of a lever, L, by means of a strap, $l$. The handle of this lever rises alongside of the driver's seat F', so that the driver, by vibrating this handle, can raise or depress the cutting apparatus as he may desire to cut high or low. Notches are made in the edge of the horizontal board F to receive and hold lever L after its adjustment. M designates the reel, the shaft of which has its bearings in the front ends of two arms, P P', which are pivoted at their rear ends so that they can be given vertical vibration. A short distance in advance of the pivoted ends of the reel-arms, a rod, Q, is applied to them, carrying pinion spur-wheels $p\ p$, which engage with the teeth of two supporting-racks, $v$, of segment form. That end of the rod Q which is next the driver's seat F' has a handle, Q', secured on it, to which a spring-catch is applied, adapted to engage with a perforate segment, R, on the inner reel-arm P'. By vibrating handle Q' the reel can be raised or depressed, and by means of the catch on this arm, the reel will be held after its adjustment. The reel receives rotation from a bevel-wheel, $q$, on the shaft of pulleys $b^3$, through the medium of bevel-wheel $r$, shaft $r^1$, pulleys $r^2\ r^3$, and a belt, $t$.

What I claim as new is—

1. The band-trough I, arranged above the delivery end of the elevator, as and for the purpose set forth.

2. The reel M, journaled to the front end of the arms P P, pivoted to the rear end of the machine, in combination with the shaft Q, having pinions $p\ p$, racks $v$, latching-lever Q', and perforated segment R, substantially as and for the purpose set forth.

3. Wheels B B', applied in pivoted frames $A^1\ A^3$, in combination with the draft-frame A, the chains $i\ i$, pulleys $j\ j$, and a winding and unwinding rod, J, arranged as described.

In testimony that I claim the above, I have hereunto subscribed my name in the presence of two witnesses.

THOMAS P. BENTON.

Witnesses:
H. C. KEYSAR,
GEO. OWEN.